United States Patent [19]
Troescher

[11] Patent Number: 5,195,266
[45] Date of Patent: Mar. 23, 1993

[54] FISH LURE

[76] Inventor: Robert H. Troescher, 33 Abrams Pl., Lynbrook, N.Y. 11563

[21] Appl. No.: 809,339

[22] Filed: Dec. 18, 1991

[51] Int. Cl.⁵ .............................................. A01K 85/00
[52] U.S. Cl. ........................................ 43/17.6; 43/17.5
[58] Field of Search .............................. 43/17.5, 17.6

[56] References Cited

U.S. PATENT DOCUMENTS

| | | | |
|---|---|---|---|
| 2,217,565 | 10/1940 | Seigle | 43/17.6 |
| 2,236,215 | 3/1941 | Klinitski | 43/17.5 |
| 2,358,576 | 9/1944 | Jackell | 43/17.5 |
| 3,421,246 | 1/1969 | Jinushi | 43/17.5 |
| 3,608,228 | 9/1971 | Borresen | 43/17.6 |
| 4,070,784 | 1/1978 | Yokogawa | 43/17.5 |
| 4,437,256 | 3/1984 | Kulak | 43/17.6 |
| 4,748,761 | 6/1988 | Machovina | 43/17.5 |
| 4,811,513 | 3/1989 | Grobl | 43/17.6 |
| 5,063,700 | 11/1991 | Kiefer | 43/17.6 |

FOREIGN PATENT DOCUMENTS 100948 11/1965 United Kingdom ................. 43/17.5

*Primary Examiner*—Kurt C. Rowan

[57] ABSTRACT

A fish lure comprising a transparent tube containing a light emitting diode, a first metallic sleeve in contact with the inner wall of the tube, a second metallic sleeve in contact with the inner wall of the tube and with the first metallic sleeve, and a third metallic sleeve inside of and spaced from the second metallic sleeve. A power supply device is disposed in the first metallic sleeve in electrical communication with all of the sleeves and the diode.

6 Claims, 1 Drawing Sheet

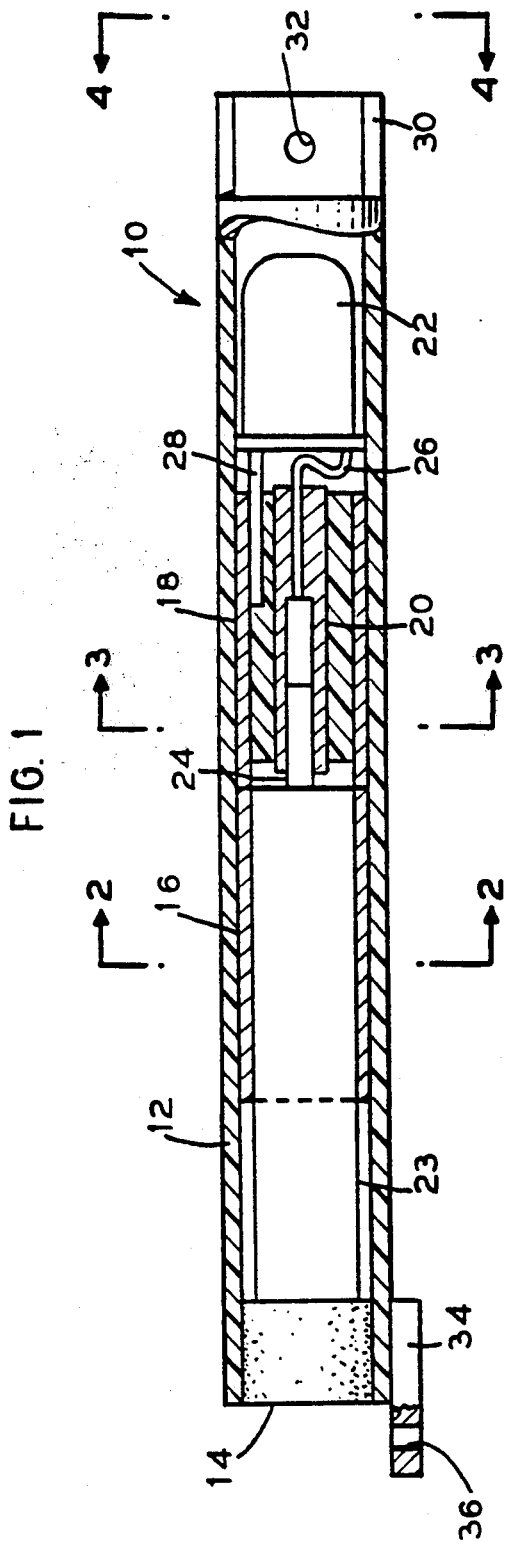
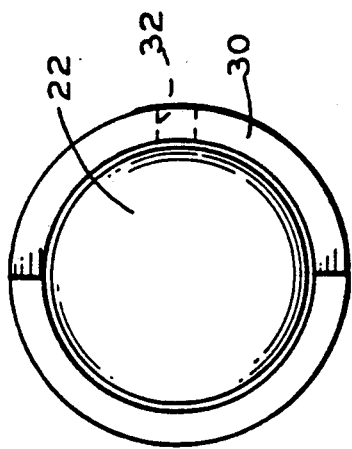
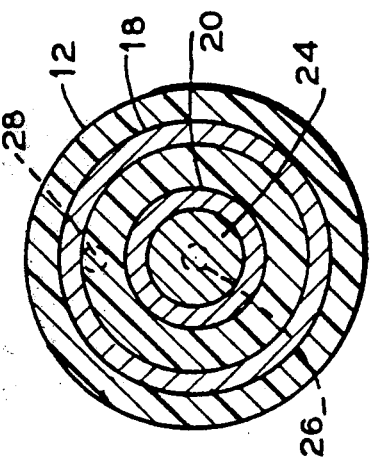
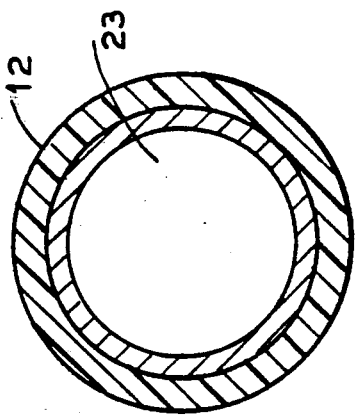

FISH LURE

BACKGROUND OF THE INVENTION

This invention relates to a fish lure and, more particularly, to an illuminated fish lure.

While it is common for fishermen to use illuminated lures, such lures are subject to one or more disadvantages with respect to price, reliability, complexity, and durability, specially those that provide illumination by mixing chemicals or by incandescent lamps.

SUMMARY OF THE INVENTION

The general object of the present invention is the provision of a fish lure possessing the virtues of compactness, simplicity, reliability, durability, and inexpensiveness. In accordance with the invention, the fish lure comprises a transparent tube containing a light emitting diode, a first metallic sleeve in contact with the inner wall of the tube, a second metallic sleeve in contact with the inner wall of the tube and with the first metallic sleeve, and a third metallic sleeve inside of and spaced from the second metallic sleeve. A power supply device is disposed in the first metallic sleeve in electrical communication with all of the sleeves and the diode.

BRIEF DESCRIPTION OF THE DRAWINGS

Further objects and advantages will become apparent from the following description and claims and from the accompanying drawings, wherein:

FIG. 1 shows a sectional view of a fish lure according to the present invention;

FIG. 2 is a sectional view taken along the line 2—2 of FIG. 1;

FIG. 3 is a sectional view taken along the line 3—3 of FIG. 1; and

FIG. 4 is an end view taken along with the line 4—4 of FIG. 1.

DESCRIPTION OF THE PREFERRED EMBODIMENT

As shown in FIG. 1, fishing lure 10 includes a transparent tube 12 in the shape of a syringe closed at one end by a plastic plug 14 and containing metallic tubular sleeves 16, 18, and 20 and a light-emitting diode 22. Sleeve 16 is axially spaced from plug 14 and in contact with the inner wall surface of tube 12. Sleeve 18 is in alignment with and of the same diameter and length as sleeve 16, is in contact with the inner wall of tube 12, and has one end in contact with sleeve 16. Sleeve 20 is disposed inside of, concentric with, spaced from, and of the same length as sleeve 18; has one of its ends extending slightly beyond the corresponding end of tube 18 and its opposite end spaced from and inside of the corresponding end of sleeve 18; and has a uniform inside diameter along part of its length and smaller uniform inside diameter along the remainder of its length. The space between the outer circumferential wall surface of sleeve 20 and the inner circumferential wall surface of sleeve 18 is filled with epoxy to maintain a fixed relation between these sleeves and to electrically insulate them from each other. A battery 23 having a metallic exterior is disposed in most part inside of, in contact with, and supported by sleeve 16 and has a tubular end portion 24, constituting the positive side of the battery, in contact with the inner circumferential wall surface of sleeve 20 along its large inside diameter portion. Diode 22 is located at the opposite end of tube 12; has its flanged portion in contact with the inner circumferential wall surface of tube 12 adjacent sleeves 18 and 20; has one lead 26 soldered to the inner circumferential wall surface of sleeve 20 along its small inside diameter portion to make a connection to the positive side of battery 23 by way of sleeve 20; and has a second lead 28 soldered to the inner circumferential wall surface of sleeve 18 to make a connection to the negative side of battery 23 by way of sleeves 18 and 16. So the electrical loop is formed by lead 28 of diode 22 connected to sleeve 18, which is in contact with sleeve 16, which is in contact with the body of battery 23, which has extension 24 plugged into sleeve 20, which is connected to lead 26 of diode 22 to complete the electrical circuit.

The diode end of tube 12 may be sealed by a plug similar to plug 14 or by a clear epoxy surrounding the diode and filling the space between the diode and the inner circumferential wall of tube 12. Tube 12 has part of its circumferential wall cut away at its diode end to provide an extension 30 formed with an opening 32 to accommodate a fish hook; while the battery end of tube 12 is formed with a plastic extension 34 having an opening 36 for connection of a fishing line.

By way of example, and not of limitation, tube 12 is made of transparent plastic, has an outside diameter of 0.265"0.67 cm), and inside diameter of 0.192" (0.49 cm), and a length of 2.5" (6.35 cm). Sleeves 16, 18 and 20 are made of brass. Each of the sleeves 16 and 18 has an outside diameter of 0.188" 0.48 cm), and inside diameter of 0.162" (0.41 cm), and a length of 0.518" (1.32 cm). Sleeve 20 has a length of 0.518" (1.32 cm), an outside diameter of 0.068" (0.17 cm), an inside diameter of 0.042" (0.11 cm) along pat of its length and 0.030" 0.08 cm) along the remainder of its length. The main part of battery 23 has a diameter of 0.159" (0.40 cm) and a length of 0.773" (1.96 cm), while its extension 24 has a length of 0.206" (0.52 cm) and a diameter of 0.042 (0.11 cm). Suitable batteries include types BR425 and BR435, each having an output of 3 volts and available from Radio Shack or Panasonic. A light emitting diode having a brightness from 5 to 350 mille-candles is preferred and is available from IDI, Rohm, Kingsbright, Marktech, or Stanley.

In operation, energy from battery 22 to diode 22 is provided by so inserting the battery into tube 12 and sleeve 16 that its end portion 24, is plugged into sleeve 20, with plug 14 then being applied to the battery end of tube 12 to seal the battery from water. When the lure is not in use, the battery can be disconnected.

I claim:

1. A fish lure comprising
   a transparent tube,
   a light emitting diode in the tube,
   a first metallic sleeve in the tube in contact with the inner wall thereof,
   a second metallic sleeve in the tube in contact with the inner wall thereof and with the first metallic sleeve,
   a third metallic sleeve inside of and spaced from the second metallic sleeve, and
   a power supply device in the first metallic sleeve in electrical communication with all of the sleeves and the diode.

2. The fish lure of claim 1 wherein the third metallic sleeve is electrically insulated from the second metallic sleeve.

3. The fish lure of claim 2 wherein the diode has a pair of metallic leads, one lead being connected to the inner wall of the second metallic sleeve, the other lead being connected to the inner wall of the third metallic sleeve.

4. The fish lure of claim 3 wherein the power supply device is in direct electrical contact with the inner wall of the first metallic sleeve and the inner wall of the third metallic sleeve.

5. The fish lure of claim 1 further comprising means for sealing the opposite ends of the tube.

6. The fish lure of claim 1 wherein the tube is formed by plastic material.

* * * * *